United States Patent
Clavey

[11] 3,918,628
[45] Nov. 11, 1975

[54] METHOD OF WELDING TANKS
[75] Inventor: William F. Clavey, Seattle, Wash.
[73] Assignee: Paccar Inc., Bellevue, Wash.
[22] Filed: Jan. 2, 1974
[21] Appl. No.: 429,597

Related U.S. Application Data
[62] Division of Ser. No. 271,399, July 13, 1972.

[52] U.S. Cl. .............. 228/213; 219/60 A; 219/64; 228/4.1; 228/44.1
[51] Int. Cl.² ........................................ B23K 37/04
[58] Field of Search .......... 29/471.1, 475; 113/120; 219/59, 60, 64; 228/4, 6, 44; 269/287

[56] References Cited
UNITED STATES PATENTS

| | | | |
|---|---|---|---|
| 1,904,913 | 4/1933 | Adams, Jr. | 113/120 |
| 2,558,966 | 7/1951 | Lane, Jr. | 269/287 |
| 2,684,603 | 7/1954 | Schonberg | 228/6 |
| 2,753,826 | 7/1956 | Dougherty | 228/6 |
| 3,634,648 | 1/1972 | Morris et al. | 219/60 X |

Primary Examiner—Francis S. Husar
Assistant Examiner—Gus T. Hampilos
Attorney, Agent, or Firm—Seed, Berry, Vernon & Baynham

[57] ABSTRACT

A semi automatic machine for welding fuel tanks of a general cylindrical configuration. The machine is adjustable to handle more than one size tank and once properly adjusted will accurately position and hold the tank for the longitudinal side seam weld as well as slowly rotating the cylinder for the two end seam welds. In addition to properly positioning and holding the tank during the side seam welding process, the machine also positions the end members and forces them into the opposite ends of the side seam welded cylinder assuring a properly aligned and fitted tank prior to the end seam welding process.

3 Claims, 18 Drawing Figures

FIG. 1
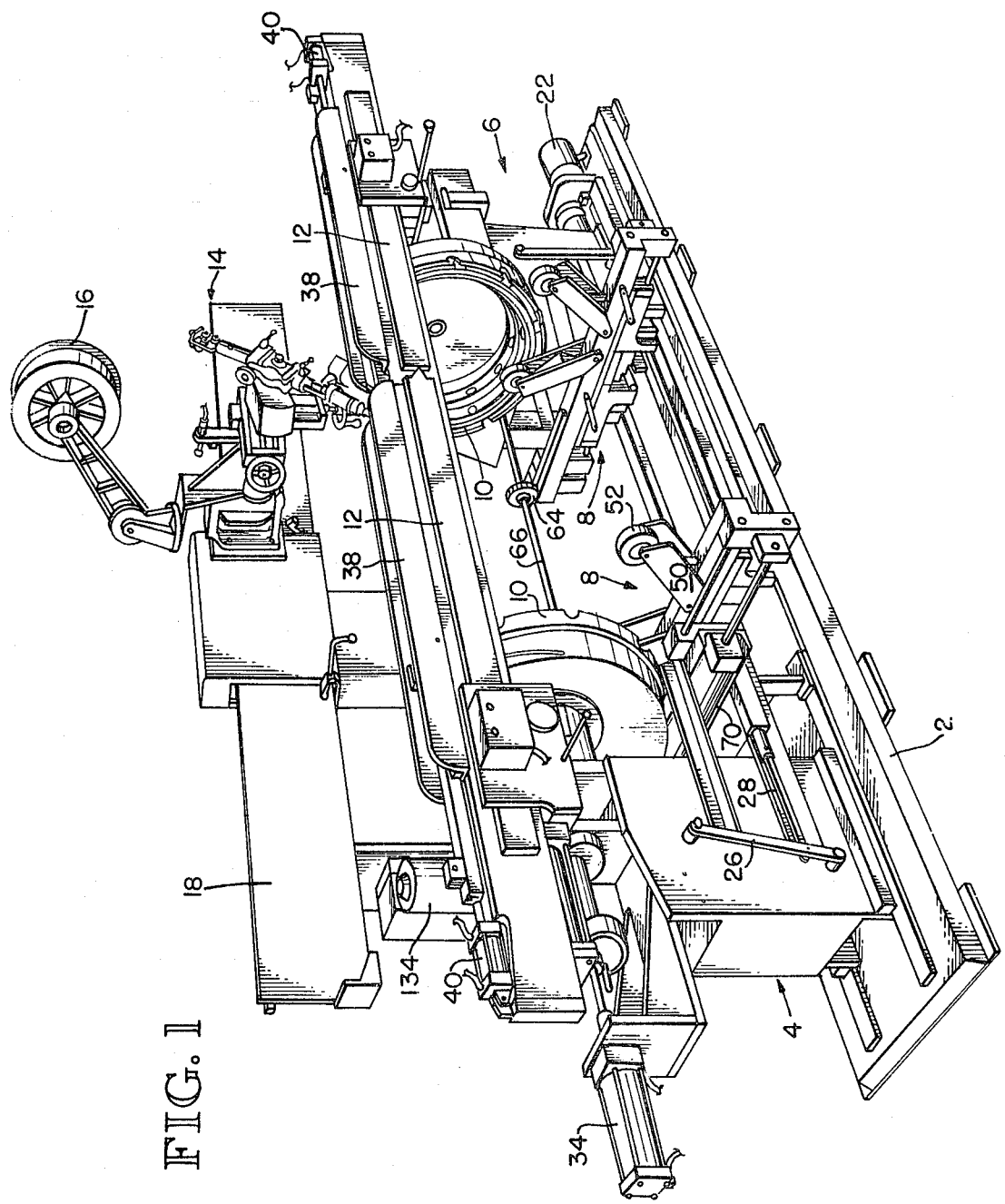
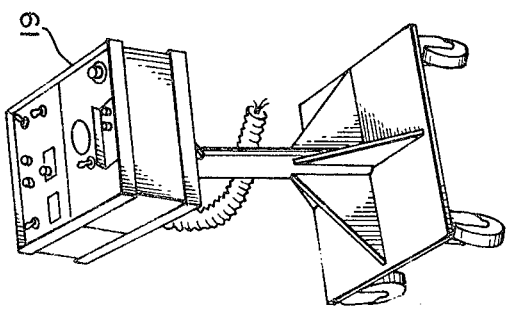

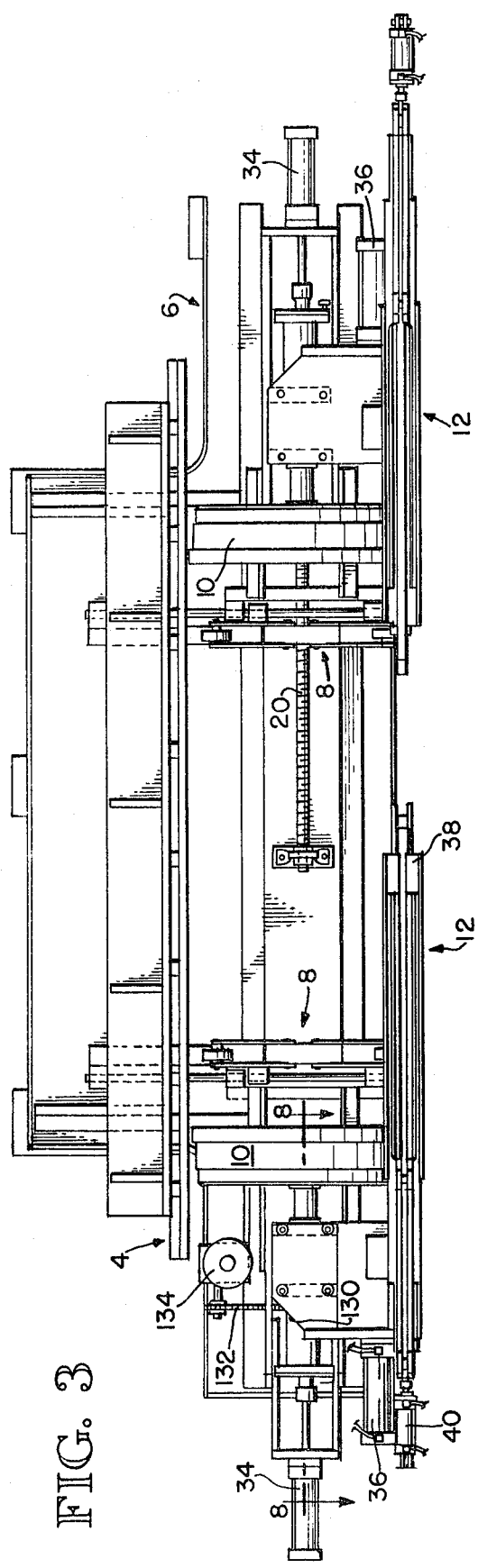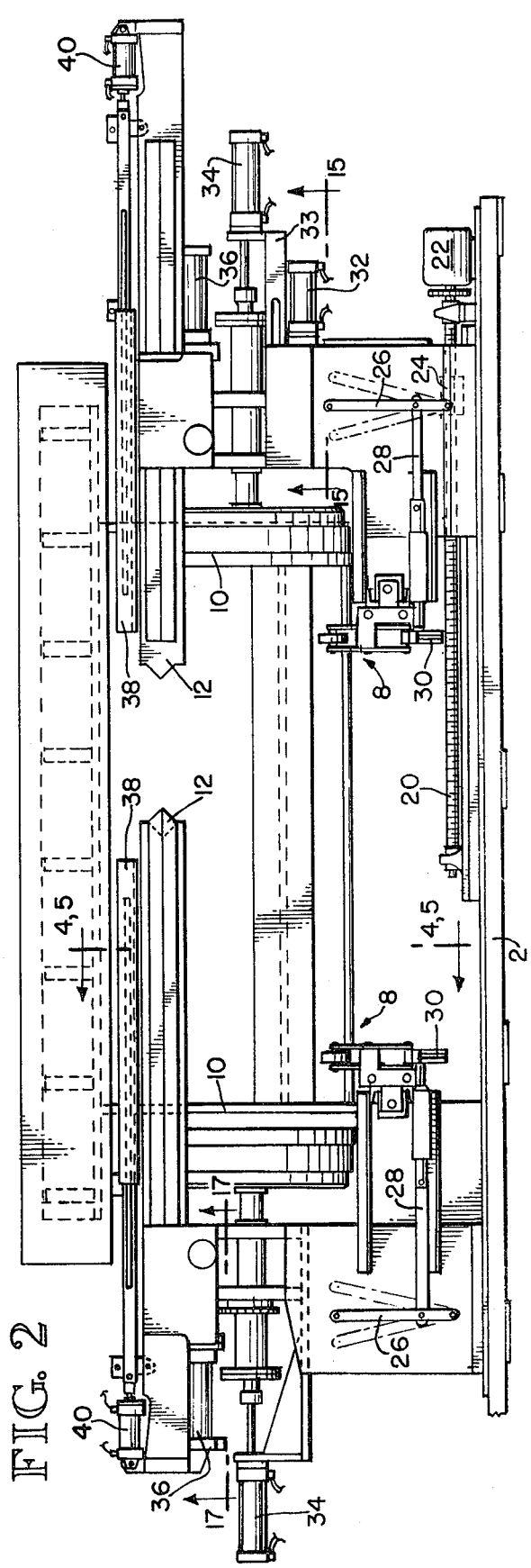

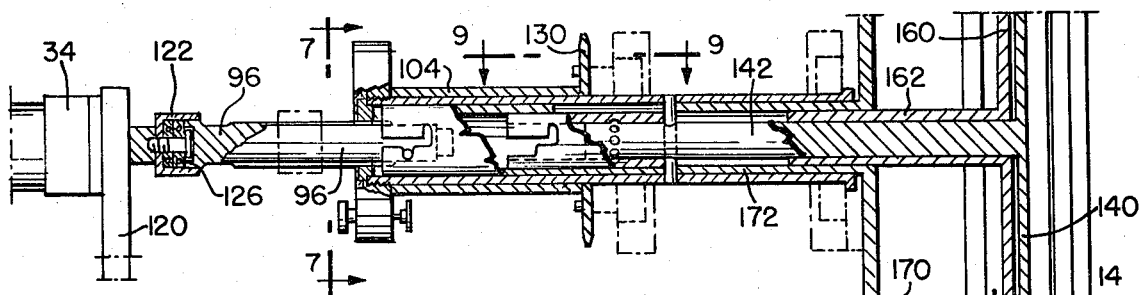
FIG. 8
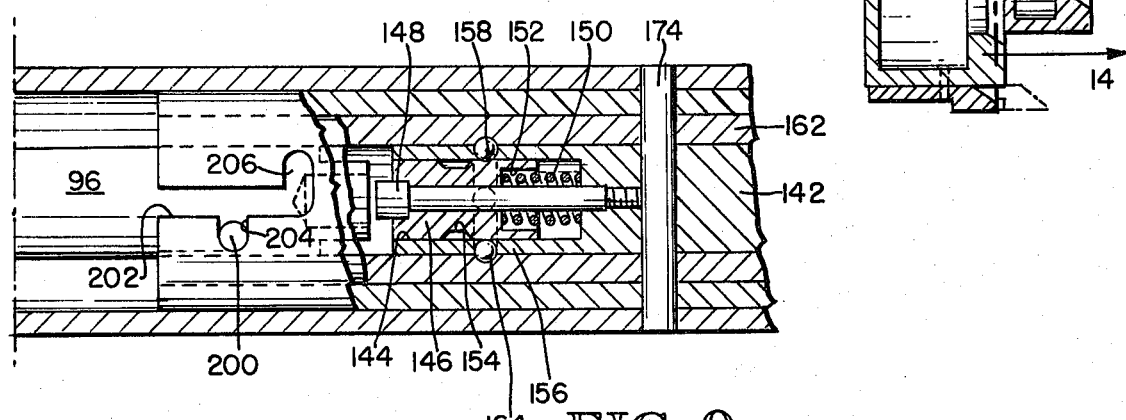
FIG. 9
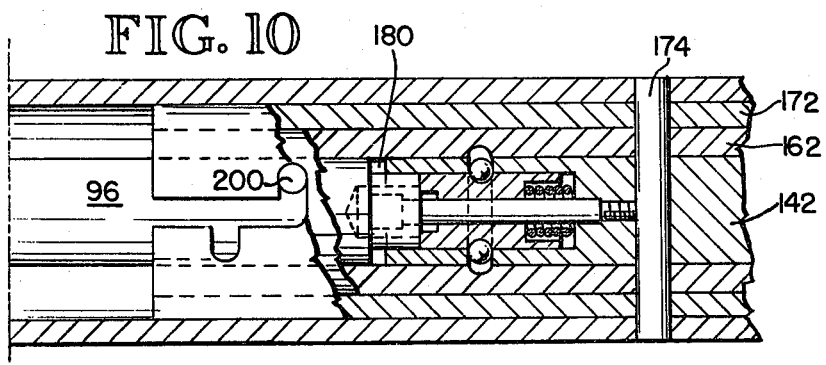
FIG. 10
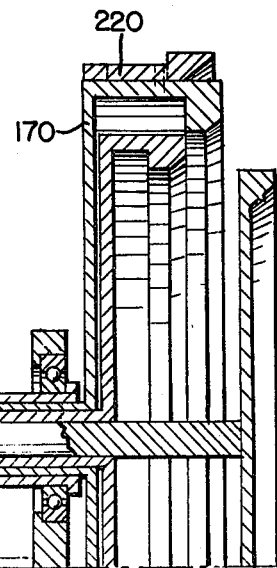
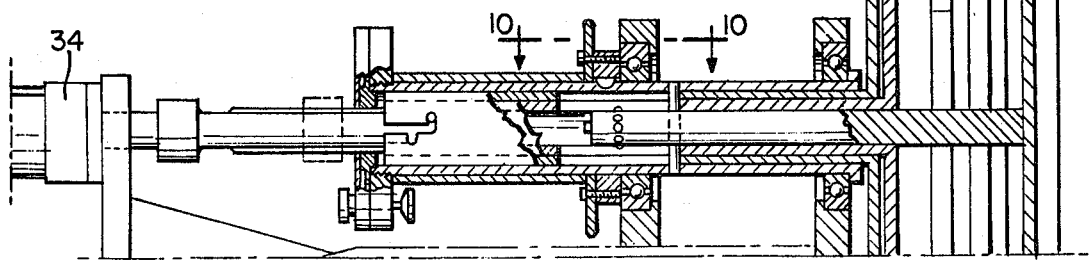
FIG. 11

METHOD OF WELDING TANKS

This is a division, of application Ser. No. 271,399, filed 7/13/72.

BACKGROUND OF THE INVENTION

Fuel tanks for vehicles such as trucks and the like are normally of a large generally cylindrical configuration having a large carrying capacity. These tanks have, in the past, been fabricated by a process involving many steps, many men and many separate devices. Typically, the steps involved in fabricating a tank of this nature have included among others the preparation of the wrap sheet, rolling the wrap sheet to a cylindrical configuration, lowering the material into the dip tanks where the sheet is etched, moving the elements to the weld area, seam welding the longitudinal seam, installing the ends, end welding to secure the ends and then moving the tank sub assembly prior to installing it upon the chassis of the vehicle. This multitude of steps have made the fabrication of the fuel tanks extremely costly. Further, a large amount of the area within a fabricating facility has had to be reserved for storage of tanks in process since storage for these bulky items has been provided adjacent each operation to accommodate varying rates of production at the consecutive steps.

With the continually increasing cost of floor space combined with the similarly increasing cost of labor it is desirable to combine several of the above noted operations such that they may be handled at one work station and preferably by one operator, if possible. In the present instance, the bulk of the object makes it extremely desirable to reduce, if not eliminate, inprocess storage as well as reduce the movement of partially completed tanks from one location to another.

An additional problem with the prior method of fabricating tanks of this nature has been the problem of handling and properly positioning a bulky object, such as a large cylindrical tank, for the next sequential operation. The time and effort involved in these functions is extremely costly in that it is essentially non productive.

It is extremely desirable, therefore, to incorporate as many operations as possible into an automated sequence, assuring proper positioning for the next step. The combination of several operations at one work station assures, as noted above, the proper positioning for the next operation and also eliminates the down or non productive time of an employee necessitated during the movement of the necessary material from one work station to another.

With the above known prior methods and problems in mind it is an object of the present invention to provide a mechanism for combining several of the steps involved in the fabrication of a fuel tank thereby reducing the amount of inprocess storage as well as reducing the number of man hours and machines necessary to fabricate a cylindrical fuel tank.

It is yet another object of the present invention to provide a fuel tank welding machine wherein the same machine is used for longitudinally seam welding and the end seam welding eliminating the need to move and reposition the bulky cylindrical shell.

It is yet another object of the present invention to provide a semi-automatic tank welding machine which is, through a simple adjustment, capable of handling more than one size tank, and is capable of properly positioning and securing the tank for both the side seam weld and the end weld.

It is still another object of the present invention to provide a semi-automatic tank welding machine wherein the operator controls the welding gun thus assuring that a fluid tight weld is accomplished, however, the machine properly places the tank for the seam weld and clamps the butting ends of the wrap sheet in close proximity for said weld as well as inserting the end panels and then holding the wrap sheet and the ends in proper position during the end seam weld.

BRIEF DESCRIPTION OF THE DRAWINGS

FIG. 1 is an isometric view of the inventive tank welding machine generally showing the relative placement of the various elements.

FIG. 2 is a front side elevational view of the inventive tank welding machine.

FIG. 3 in a top plan view of the inventive tank welding machine.

FIG. 8 is a sectional view of the operative mechanism controlled by the handle of FIG. 7 taken along lines 8—8 of FIG. 3.

FIG. 9 is an enlarged section along lines 9—9 of FIG. 8 depicting the internal operative mechanism of FIG. 8.

FIG. 10 is an enlarged section along the same line as FIG. 9 showing the mechanism in a position for operation upon a tank of a different diameter from that of FIG. 9.

FIG. 11 is a view similar to FIG. 8 showing the end plate in the position it would assume during the actual and welding operation, holding the ends in position but providing access for welding.

DETAILED DESCRIPTION OF THE DRAWINGS

Figure 5:
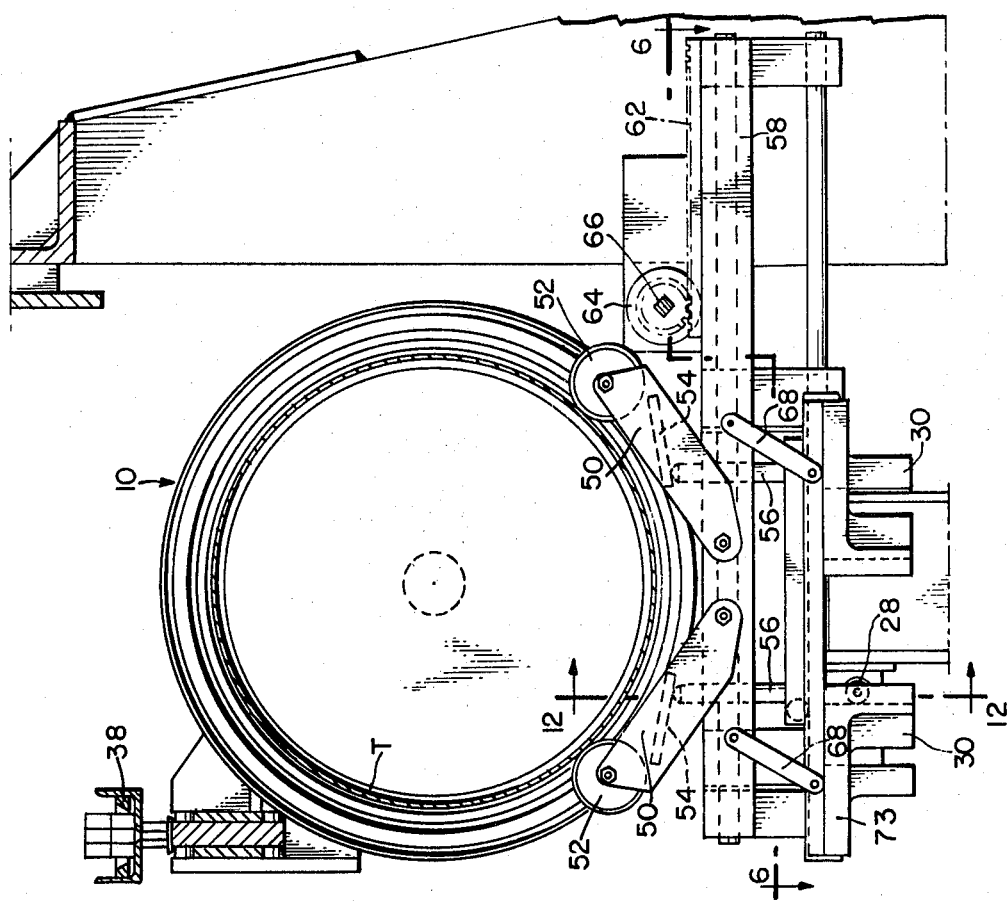
FIG. 5 is a sectional view along lines 5—5 of FIG. 2 depicting another position assumed by the supporting mechanism.

As seen in FIG. 1 the inventive tank welding machine includes a main framework 2 adapted to be secured to the floor of the manufacturing facility. Mounted to the upper portion of the framework is the mechanism which supports and moves the tank to the proper position for the sequential welding stages. One end 4 of the tank welding machine is fixed relative to the framework. The second end 6 of the tank welding machine is mounted upon tracks and is relatively movable to adjust the space between elements of 4 and 6 to accommodate the tanks of various length.

Mounted to each end 4 and 6 is a tank supporting and positioning mechanism 8 which holds the preformed metallic shell for tanks of various diameters and moves them to proper position for both the side seam weld and the end seam weld as will be described in greater detail hereafter. Mounted generally above and outboard of the tank supporting and positioning mechanisms are a plurality of tank end inserters 10 which place the tank ends within the welded wrap sheet and hold them in position during the end seam weld. Forwardly and generally above the end inserters and holders are a pair of longitudinally movable arms 12 which are moved from the position as shown which would be the position to support a tank for the seam weld to a second position whereat the abutting ends are outside of the end placement elements 10 for ease of placement and removal of the wrap sheet.

Located generally above the previously described mechanism is the welding gun 14 with its supply of weldment 16. The welding gun 14 is mounted for longitudinal movement along the axis of a tank T that it may properly weld the side seam of the tank and is adapted to be held stationary while the tank is rotated for the end seam weld. The entire welding mechanism is mounted for movement upon a bar 18 during the side sea weld. The mechanism which permits the movement of the welding mechanism is of a commerical nature and not considered critical to this invention and therefore not described in detail.

As seen in the lefthand portion of FIG. 1 there is a main control box for sequencing the operations and starting and stopping the entire tank welding machine. As is obvious, this control box 19 is mounted upon wheels for ease of placement by the operator to a convenient location.

Referring now to FIGS. 2 and 3, wherein the relative location of the various elements may more readily be seen, it becomes apparent that the side seam weld takes place at the relatively forward portion of the mechanism so that the operator may reach over the top of the supports and clamping member 12 and move the welding gun the length of the seam. Following the side seam weld the cylinder is moved rearwardly by means of the cylinder support and placement members 8 which, as will be described in greater detail hereafter, are interconnected such that the movement of one will be identical to the movement of the other.

As noted above, the particular mechanism herein described is adjustable for a variety of tank sizes and a substantial portion of the righthand end 6 of the tank welding machine is movable toward or away from the lefthand end 4 by means of a screw 20 which has one end suitably mounted in a bearing and rotationally driven by an electric motor 22 at the other end. Mounted beneath the righthand end 6 of the tank welding machine is a nut 24 which is threaded to the screw 20 such that rotational movement of the screw causes movement of the righthand end 6 of the tank welding machine.

Gas tanks have the same general cylindrical configuration regardless of size, the longer the tank is along its axis, the larger in diameter it is. To accommodate the proper diameter, the tank welding machine includes an adjusting means controlled by a convenient handle 26 which is shown on both the ends 4 and 6. The handle, as shown, has three discrete positions but is not limited to three positions. The three positions used in the preferred embodiment reflect the three most utilized sizes in the truck industry but it is to be understood that the machine could be made to have any number of desired various positions. The handle 26 controls an elongated bar or rod 28 generally parallel to the longitudinal axis of the tank welding machine and extends inboard of the handle 26 toward the carriage which controls the placement of the tank supporting and moving mechanism 8. As will be described in greater detail hereinafter, the bars or rods 28 extend to a position beneath the carriages that support the tank positioning members 8 and depending upon the location of the handle 26 will contact a stop 30 which causes the mechanism 8 to raise or lower to the proper position for end insertion and/or the side seam welding operation.

It has been found that the control of end 6 of the tank welding machine by the motor 22 and screw 20 combination is not sufficiently accurate to assure consistent automated operation. For this reason a ram 32 is also provided for positioning the operating elements, which are mounted upon a slide, for the accurate location necessary for automatic control of the entire sequence of steps.

Mounted upon each end of the tank welding machine and secured to the end insertion and rounding mechanism 10, which will be described in greater detail hereinafter, is an hydraulic ram 34 which causes the entire mechanism to move forward, rounding the cylinder and inserting the end piece and then withdrawing a preselected set of the concentric elements to permit welding of the end portion. Mounted to the respective end portions is another ram 36 which moves the clamping and locking arms 12 from the position shown in FIG. 1 to a position whereat they are outside of the end placement and holding members to allow easy tank placement and removal. This ability to permit easy access requires movement of the arms 12 far greater than the throw of the ram 36 and therefore includes, as will be described hereinafter, a distance multiplying rack and pinion mechanism.

To assure that the unwelded shell for the tank is held securely in position with the edges abutting during the side seam weld, there are provided clamping arms 38 mounted upon the top of the supporting arms 12. The clamping arms 38 are mounted upon a pair of pivotably mounted parallel arms and are operated by a ram 40 secured to arm 12 which causes the arm 38 to move forwardly and downwardly, securing the shell in proper position for the welding.

Figure 4:
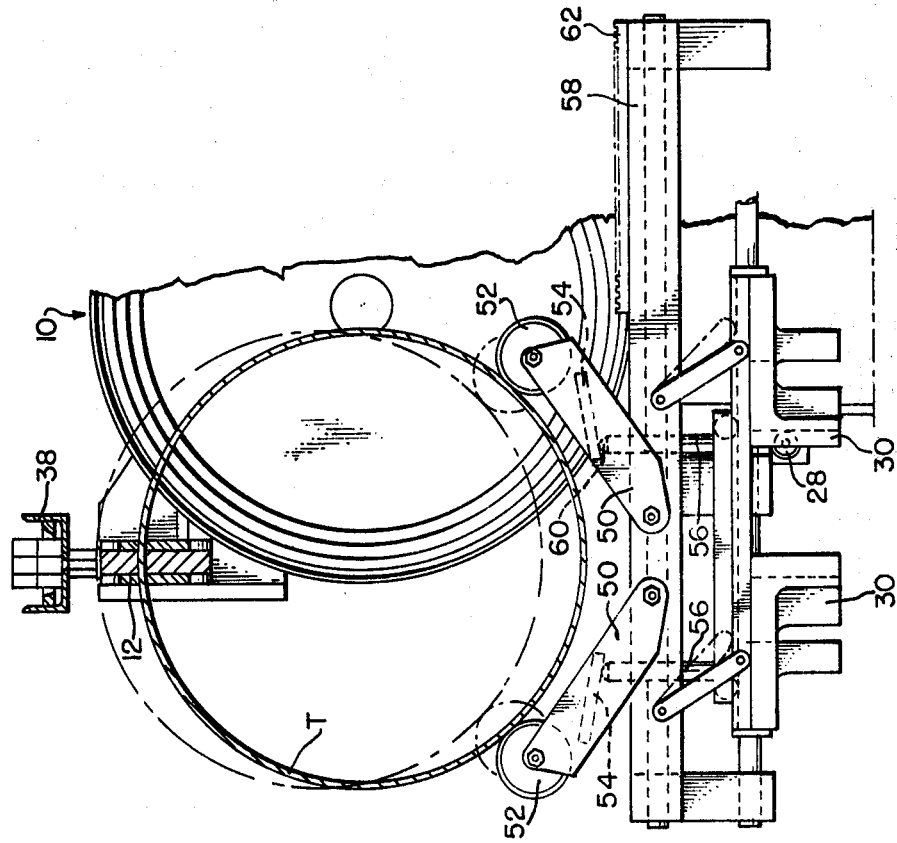
FIG. 4 is a view along lines 4—4 of FIG. 2 showing the tank positioning mechanism.
Figure 6:
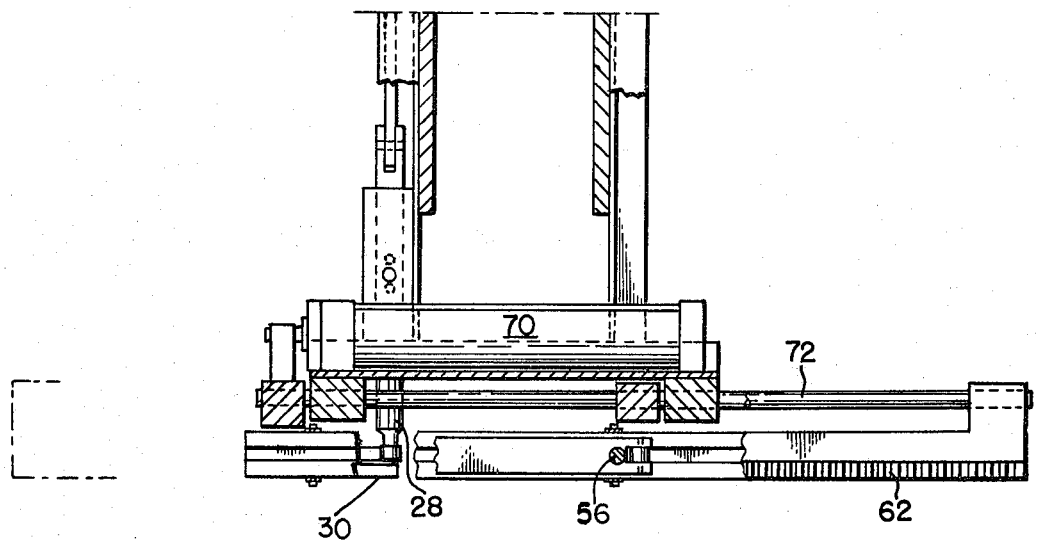
FIG. 6 is a sectional view along lines 6—6 of FIG. 5 showing the operating mechanism controlling lateral movement of the track of the tank to be welded.

Referring now to FIGS. 4, 5 and 6, the means for supporting the cylindrical shell during the side seam welding, as well as the means for moving it to proper position for the end insertion and end seam welding can be seen in greater detail.

As seen in FIGS. 4 and 5, the carriage mechanism comprises a pair of pivotally mounted arms 50 each having a cylinder contacting wheel 52 on the outer end thereof. Mounted upon the inboard side of each of the arms is a transverse flat plate 54 which is in contact with a relatively vertical pusher arm 56. Pusher arm 56 extends through the upper portion 58 of the carriage and has a wheel 60 at its upper end which contacts the lower surface of plate 54. The upper portion of the carriage 58 carries a rack 62 upon its upper surface and which, as can be seen in FIG. 5, has meshed therewith a pinion 64. Mounted to the pinion for rotation therewith is a rod 66 which extends across the rear portion of the tank welding machine to the opposite side whereat there is an identical rack and pinion set up. This positive interlock assures that the movement of the carriages on both sides of the tank welding machine are coordinated.

Secured to the upper carriage element 58 by a pair of parallel links 68 is a lower carriage member 73 which has a plurality of stops 30 depending therefrom. The stops 30, in the preferred embodiment, include three separate step elements, and, as noted above, are adapted for interaction with the rod 28 such that when moving both forwardly and rearwardly the stop 30 will have its appropriate step contact the rod 28. A hydraulic ram 70 (see FIG. 6) urges movement of the upper carriage forward and aft in a predetermined sequence. When the rod 28 contacts the appropriate step of the stop 30, the ram 70 continues to push, causing the upper carriage member to move relative to the lower carriage member and thereby causing the arms 50 to be raised and/or lowered relative to the upright pusher members 56. The entire arm 50 pivots around its pivot point to the appropriate position for placing the tank T in position for side seam welding (see phantom lines of FIG. 4) and then sequentially in proper position for end insertion (see FIG. 5). For accuracy of movement and assuring that the tank is in continual alignment, there are provided at each end of the carriage, guide members 72 which control the direction and travel of the carriage.

Figure 12:
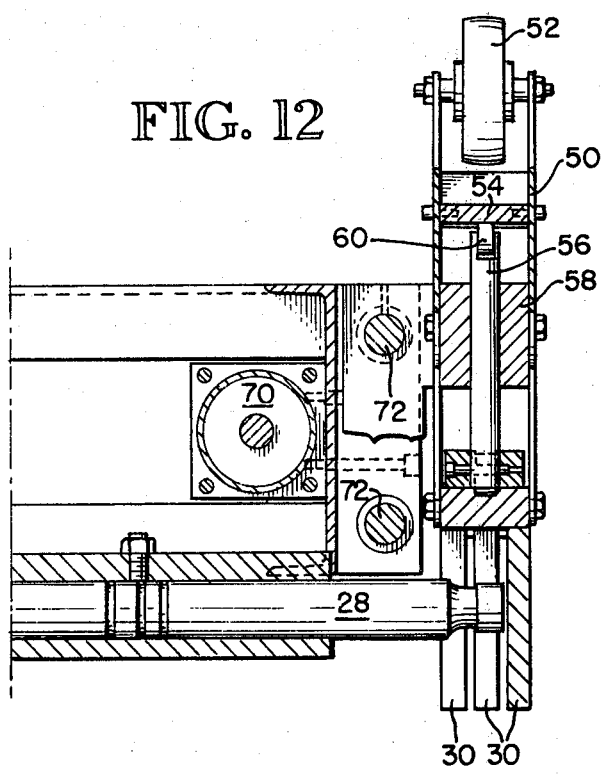
FIG. 12 is a sectional view along lines 12—12 of FIG. 5 showing the mechanism which controls the elevation and position of the cylindrical shell during the various stages of the welding process.

Reference is now had to FIG. 12 wherein a section is taken along line 12—12 of FIG. 5 and the basic relationship of the elements hereinabove described may more clearly be related, the tank has been removed for clarity.

Figure 7:
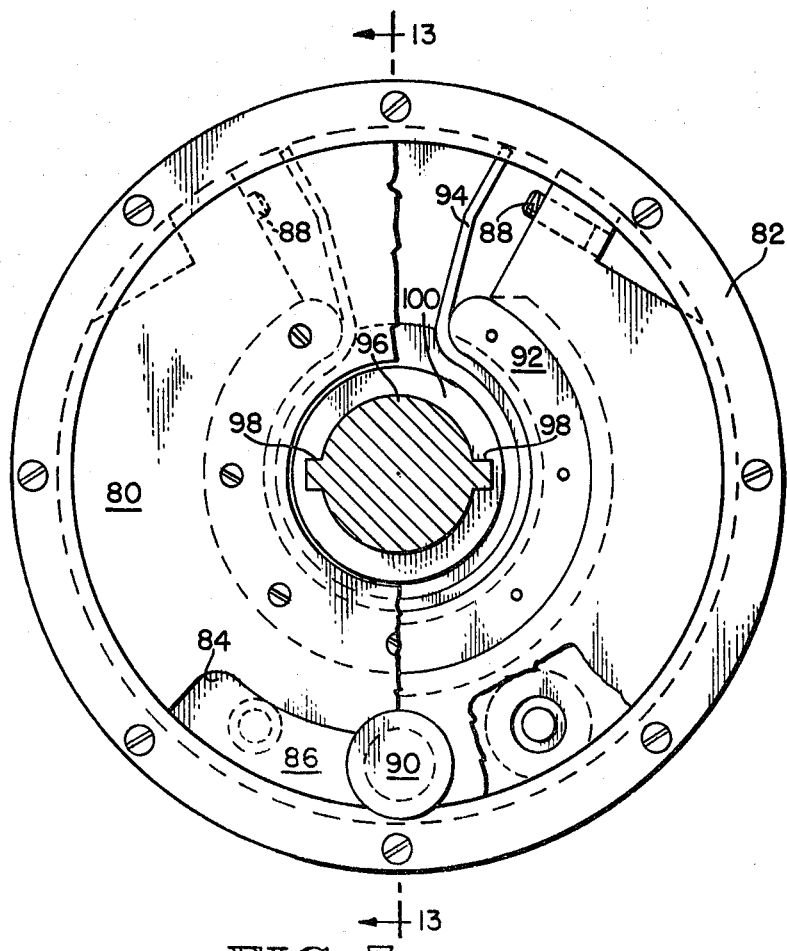
FIG. 7 is an enlarged view along line 7—7 of FIG. 8 of the mechanism by which the operator presets the machine to the diameter of the tank being welded.
Figure 13:
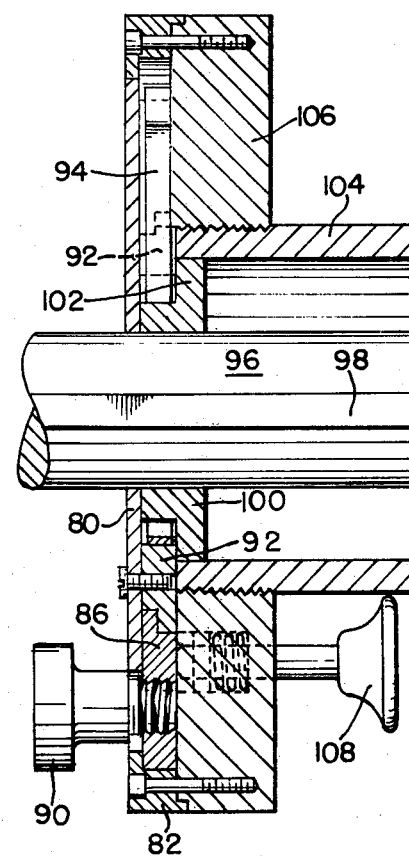
FIG. 13 is a sectional view along lines 13—13 of FIG. 7.

As noted above, the tank welding machine is capable of handling a tank of any length up to the maximum movement of the righthand end 6 of the tank welding machine. The preferred embodiment of the tank welding machine incorporates the adjustment to handle three gas tank sizes, those sizes most often used on commercial truck type vehicles. The means for controlling the end insertion and support members for the three sizes is shown in FIGS. 7, 11 and 13.

It is to be understood that with regard to the mechanism for controlling the tank diameter that it is duplicated at each end of the tank welding machine as is a large part of the mechanism hereinabove described. The selector member for predetermining operation of the tank end inserter and holder is shown in FIGS. 7 and 13 and this selector predetermines which of the concentric, end insertion, cylinder circularizing rings will be drawn back prior to the weldment process to permit access to the joint. As seen in FIG. 7, the selector mechanism comprises a generally circular face plate 80 set within a ring 82. The face plate has a groove 84 of generally arcuate configuration at its outer circumferential edge. Mounted behind plate 80 is a backing plate 86 having the configuration of a C or an axially bored sector of a circle. Plate 86 includes a pair of adjustment screws 88 protruding through the ends of the C such that the gap between the ends may be closed.

A handle 90 is mounted to C-shaped plate 86 and extends outwardly through the slot 84 of plate 80. Movement of the handle 90, as will be described hereinafter, causes movement of the plate 86 and thus the adjustment which controls the withdrawl of appropriate end section rings.

Mounted within the interior of C-shaped plate 86 is a second C-shaped ring 92. Ring 92 serves as a retainer for a spring 94. Spring 94 has generally the shape of a keyhole for receiving a skeleton type key configured to complement the interior of ring 92 and a pair of outwardly extending legs which are adapted to be contacted by the adjusting screws 88.

Passing through the axis of the hereinbefore mentioned circular plates and/or C-members is a shaft 96 having outwardly extending keys 98. Surrounding the shaft 96 is a bushing 100 which has an outwardly extending circular flange 102 which underlies the springs 94 and the ring 92.

Reference is now had to FIG. 13 wherein the various elements can be seen in side view. As seen in this view, the shaft 96 is surrounded by a hollow cylindrical shaft 104 which is threadedly engaged with a backing ring 106. Backing ring 106 is secured to the outer front ring 82. Passing through the backing ring 106 is a lock mechanism 108 which has an outwardly extending handle and is spring biased in an inward position where it seats in one of a plurality of bores in the C-shaped plate 86, thus preselecting a position as to be completely described hereinafter. Thus, it can be seen that movement of the handle 90 causes the plate 86 to move, placing one of the adjusting screws 88 into contact with one of the legs of the spring 94, placing a bias upon the spring and its circumscribing C-shaped ring 92, which as seen is secured to the plate 80, which has key ways to conform to the keys 98 on shaft 96. Thus, whenever the handle 90 is moved and lock 108 is put into a new position, there is a respective bias between cylindrical sleeve 104 and shaft 96 tending to cause relative rotation therebetween.

Attention is now directed to FIGS. 8 through 11 wherein the mechanism which controls the movement of the concentric end positioning and cylinder forming rings is shown. As seen in FIGS. 8 and 11, there is mounted at the lefthand portion of the figure the hydraulic ram 34 which urges the hereinafter described rings and the appropriate end piece into contact with the tank to be welded and then retracts the appropriate predetermined rings. The ram is mounted to a relatively fixed plate 120 and the piston rod extends through the plate and terminates in a cup shaped outwardly facing portion 122. Secured in position within the cup portion is the complementary end of shaft 96 which is mounted within bearings 126 such that shaft 96 may turn relative to the shaft containing cup portion 122. The shaft 96 extends into the selector and control mechanism described with respect to FIGS. 6 and 13, whereat it will be recalled the internal shaft 96 is biased with respect to the cylindrical sleeves 104.

Secured to the outer portion of cylindrical shaft 104 is a sprocket 130 which, as can be seen in FIG. 3, is connected by a chain 132 to an electric motor 134 for rotation of a tank when it is in position as described hereinafter.

As can be seen in FIGS. 8 and 11, there are various relatively fixed supports having internal bearings or the shaft as it extends to the right in the figure. It is to be understood that there is one of these selector and control mechanisms at each end of the tank welding machine. At the extreme right of the figure it can be seen that the tank supporting structure serves as a cylindrical-forming and end-inserting structure simultaneously.

In the illustrative embodiment, there are three separate nesting saucer-shaped elements, the innermost or smallest element 140 is rigidly connected to shaft 142 which, as seen in FIGS. 9 and 10, terminates at its inner end with a hollow axial bore 144. Mounted within the bore is a plug 146 which is held in position by a threaded element 148 which extends through the plug 146 and is seated in the shaft 142. Plug 146 is continuously urged to its outermost position by means of a compression spring 150 which is seated at the bottom of the bore 144 as well as in a bore 152 in the plug 146. Plug 146 has an annular groove 154 approximately midway its length for reasons to be hereinafter described.

Shaft 142 which overlies plug 146 has a plurality of radial bores 156 around its periphery and plurality of balls 158 which may, as described hereafter, be permitted to enter groove 154.

Referring now to FIG. 8, the second or next larger disc 160 is secured to a hollow shaft 162 which is coaxial with shaft 142 and overlies shaft 142. Shaft 162 has an axial slot in it for purposes to be hereinafter described and also a plurality of pockets 164 to receive the balls 158. When the balls 158 are in the positions as shown in FIG. 9, the two dish-shaped elements 140 and 160 are locked together since the balls 158 link shafts 142 and 162 and move as a unit, which will be described in greater detail hereinafter.

The third or largest dish-shaped member 170 is secured to the third coaxial hollow shaft 172 which is held in position by shielding and guiding cylinder 104.

When a tank is having its ends welded in place, the tank must be rotated permitting the welder to remain in one position and yet weld the entire perimeter. The shafts 172, 162 and 142 are held locked together to prevent relative rotation thereof by means of a pin 174 extending diametrically therethrough.

The shaft 96 has at its outermost end a reduced diameter portion 180 which is designed to fit within the bore 144 of shaft 142. Insertion of portion 180 into bore 144 causes the plug 146 to move to the right, as seen in the figure, compressing the spring 150 and letting the balls 158 fall into the grooves 154. This location of balls 158 permits the shaft 142 to move axially independently of shaft 162.

The control of the movement of shaft 96 relative to shaft 142 has been described hereinabove with respect to FIGS. 7 and 13, which, as will be recalled, places a bias upon shaft 96 relative to the surrounding cylindrical shaft 104 and the remaining shafts pinned thereto. If the shaft 96 is biased in a clockwise direction relative to the remaining cylindrical shafts, the shaft during the movement rightwardly or extension of the dish-shaped elements will move forward until the point whereat the key 200 engages the bottom portion of keyway 202 which has legs 204 and 206 extending outwardly therefrom in opposite directions. When the shafts are biased in a clockwise direction and the ram 34 attempts to draw rearwardly the dish-shaped elements, the pin will automatically drop into leg 204, causing the tank holding dish-shaped elements 140 and 160 to remain in an extended position to hold the tank for welding, as shown in FIGS. 8 and 9. When the shafts are biased in an opposite or counterclockwise direction, then the pin 200 will move into leg 206, causing the end portion to take the configuration as shown in FIGS. 10 and 11.

As noted above, the present structure is adapted to handle tanks of three different sizes. The smallest tank, as will be described in greater detail hereinafter, will be held in position when the dish-shaped element is withdrawn as shown in FIG. 11. The second size tank will be held in position when the dish-shaped elements are withdrawn as shown in FIG. 8. The largest size tank is handled with the control mechanism as described with respect to FIGS. 3 and 13 in a neutral position so that all of the cylinders move as a unit and the outermost dish-shaped element 170 includes a relatively movable ring 220 on the outside secured thereto by pins extending into angled grooves, such that a relative rotation of 220 relative to 170 causes the ring to move outwardly or inwardly.

Figure 14:
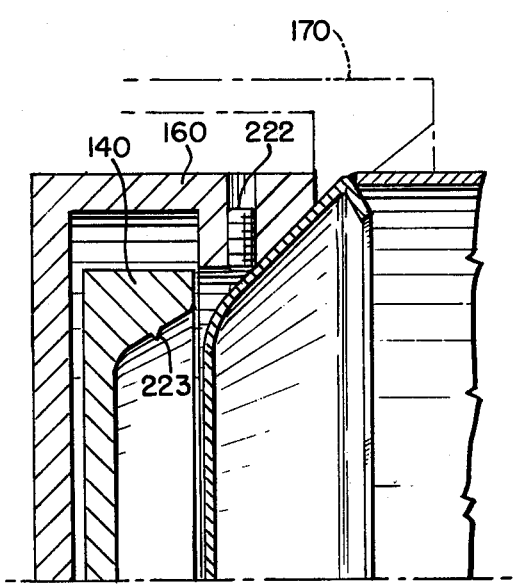
FIG. 14 is a view taken substantially along lines 14—14 of FIG. 8 and further showing a tank having its end in position for end welding.

Referring now to FIG. 14, it can be seen that the tank end portion which is shown as welded is held in position by means of the appropriate dish-shaped member, here 160, whereat it is wedged. It is to be seen here that the dish-shaped portion 140 is completely out of the way and it will operate upon the smallest element in the same fashion as to be described. When it is desired to fabricate the tank, the end portion is lightly wedged into the dish shaped portion and held there by adjusting screws 222 or some other means such as pins 233. The cylinder 34 is then activated forcing the entire complex of dish-shaped elements toward the tank. As the dish-shaped elements approach the tank the next outer cylinder, in this case 170, has, as can be seen, an inwardly sloping outermost surface which funnels the tank into proper cylindrical condition for insertion of the end. Further movement of the cylinder forces the end portion into the cylinder whereat it is wedged. The appropriate dial setting as described above then causes the next outermost cylinder or cylinder to be withdrawn to a remote location with the tank end being held in position adjacent the end of the cylinder. The relative location of the elements permits sufficient access for the welding operation about the circular seam. For weldment of the end seam the welding gun is held in a stationary position and the motor 134 is actuated, causing the entire tank to slowly rotate, allowing the proper weldment.

Figure 15:
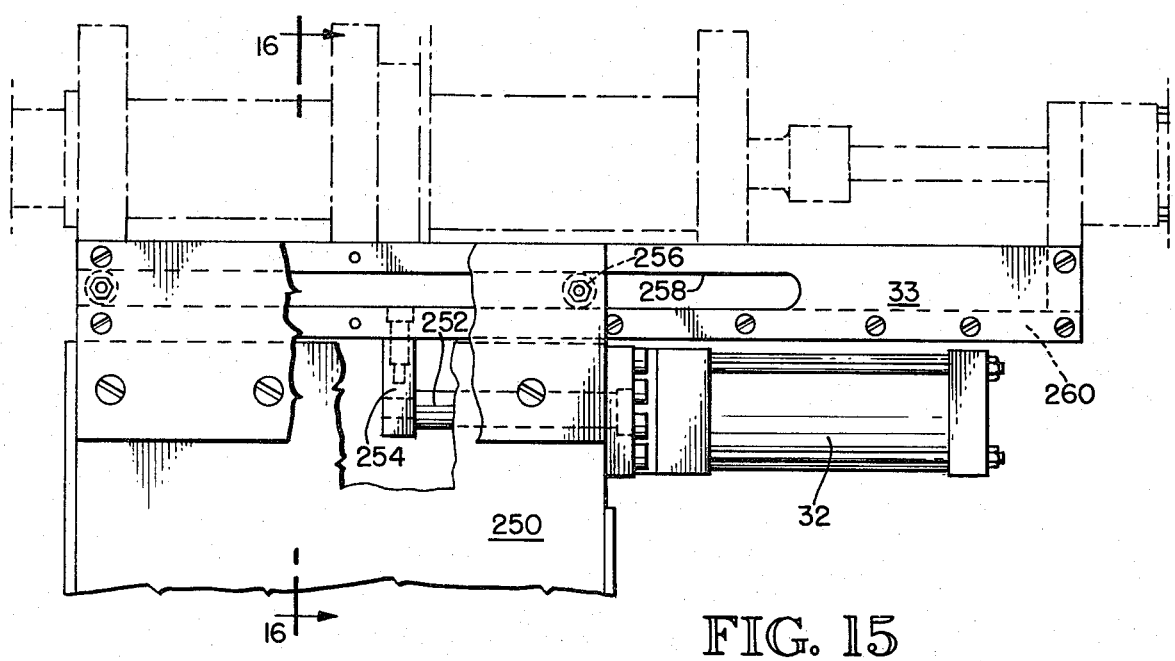
FIG. 15 is a section taken along lines 15—15 of FIG. 2 showing the operative mechanism for inserting and holding the ends of the tank in proper position.
Figure 16:
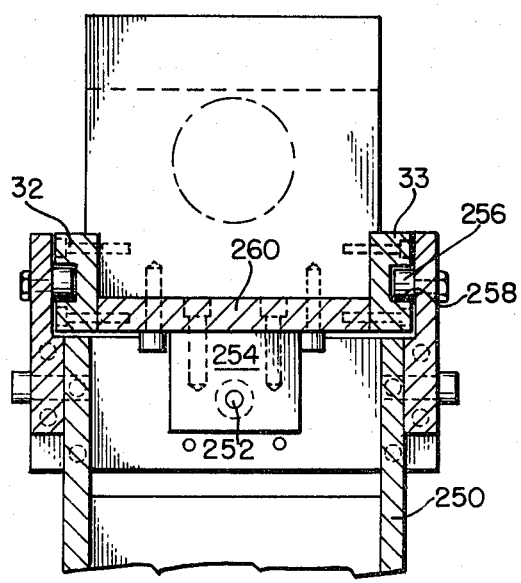
FIG. 16 is a view taken along line 16—16 of FIG. 15 further depicting the control mechanism for the end inserting phase.

The means for adjusting the relative location of the two main elements 4 and 6 of the tank welding machine is shown in enlarged detail in FIGS. 15 and 16. It will be recalled that only the right end of the tank welding machine is movable and it is first moved to a general location by means of a thread and moving nut combination and the final adjustment is made by means of a hydraulic ram. As seen in FIG. 15, the hydraulic ram 32 is secured to a relatively stable portion 250 of the main end. The rod 252 of the ram is connected to a downwardly depending member 254 which is in turn connected to a slide 33 upon which the tank end inserting and holding element is mounted. The slide 33 is secured in relative position by means of a pair of rollers 256 which glide within a slot 258 on the portion which carries the end inserting members. As seen in FIG. 16 the slide mechanism 33 is in reality a U-shaped element for stability having both sides in contact with wheels that are mounted upon the relatively stable frame element 250. The two sides 33 of the slide portion are joined by a base plate 260 which is secured to the shaft supporting portion of the end inserting member.

Figure 17:
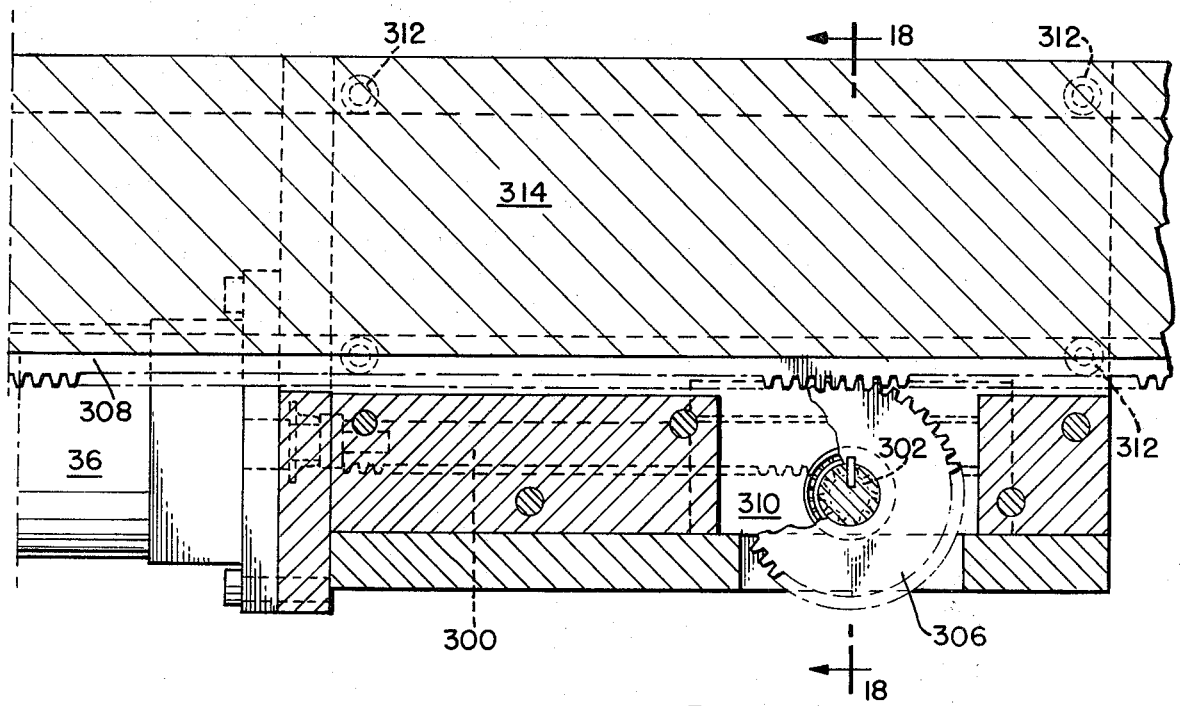
FIG. 17 is an enlarged sectional view along line 17—17 of FIG. 2 showing the mechanism used for holding the wrap sheet in proper position during the welding process of the side seam.
Figure 18:
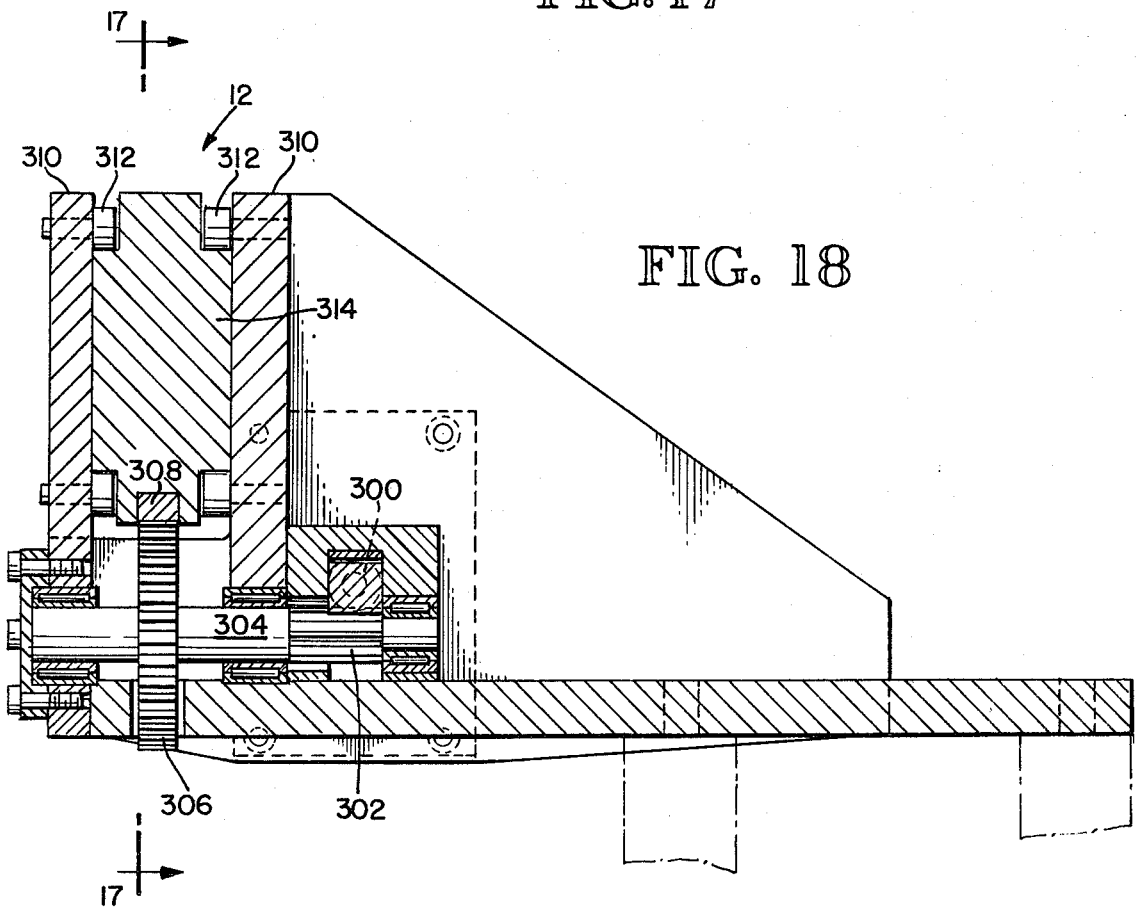
FIG. 18 is a section taken along lines 18—18 of FIG. 17 showing the distance multiplying mechanism used for the supports during the side seam positioning, securing and welding.

The mechanism which is used for moving arms 12 toward and away from the center portion of the tank welding machine, a movement which is necessary for loading the tank and holding it in position for the side seam welding, but must necessarily be retracted during the end insertion and end seam welding is shown in FIGS. 17 and 18. It is to be understood that, here again, although only one mechanism is described, an identical mechanism will be at both ends of the welding machine. Ram 36 has secured thereto a rack 300 which is in engagement with a pinion gear 302 which is a portion of shaft 304 mounted by a suitable bearing means permitting rotation relative to a fixed portion of the welding machine. The shaft 304 has a second pinion 306 secured thereto which serves as a driving pinion engaged with a rack 308 which is a portion of arms 12. As can be seen, the arms 12 are mounted between relative stable portions 310 of the frame element and is held in a relatively vertical stable position by means of rollers 312 which ride on opposite edge portions of outwardly extending shallow flanges 314 of arm 12. It can thus be seen that a short stroke of ram 36 causes a long throw of arm 12 and thus achieves the desired result.

Referring back now to FIG. 2, the top portion of arm 12 has mounted thereon a clamping means 38 which is controlled by ram 40. When the arms 12 are in their extended condition such as is shown in FIG. 1 and a tank is in position resting upon the upper portion of arm 12, rams 40 are activated causing the clamping portions 30 which are mounted on legs, to move forward and downwardly to clamp the tank in position and as can be seen in FIG. 3, the clamp 38 has an opening in its central area to allow the side seam weld without interference.

Thus, as can be seen, the hereinabove described tank welding machine permits a quick and easy means for rapid weldment of cylindrical tanks of different sizes. The change from one size tank to another does not require a change in rigging and/or mechanisms, but simply involves a change in the setting of some of the preselection elements. Once preselected, the tank welding machine is automatically controlled such that it moves from the first position whereat the side seam is welded to the rearward position and is properly placed for and insertion. The operator need only place the proper sized end in the end inserting nesting complex of saucer-like elements and operate the rams, thereby the end is inserted into position and then the appropriate outer guiding disc or dish is drawn back to permit welding while the tank is rotated. Following the welding process the step is reversed and the tank is carried forward to the operator for removal and movement to the next station. As can be seen this is a rapid, efficient method of welding cylindrical tanks.

The embodiments of the invention in which an exclusive property or privilege is claimed are defined as follows:

1. A method of manufacturing a cylindrical tank comprising the steps of:
   a. preforming a rectangular sheet into a shell having a configuration approximately the exterior shape of the completed tank;
   b. placing the preformed shell in position upon supporting arm means;
   c. clamping the shell in position upon the arm means with the opposing edges in juxtaposition;
   d. welding the side seam of the shell;
   e. placing a pair of end members in an opposed coaxial relationship at opposite ends of the shell, each of said end members being mounted within one of a set of coaxial elements adapted to engage the end member about its outer periphery;
   f. advancing the set of coaxial elements and the end member toward the shell until the end member is wedged into the shell;
   g. retracting all of the coaxial elements of the set having diameters larger than the end member while retaining those coaxial elements of the set which have diameters smaller than the end member such that the end members are retained in a shell-engaging position;
   h. welding the end seams;
   i. retracting the remainder of the set of coaxial elements;
   j. removing the welded tank from the supporting arm means.

2. A method as in claim 1 and further including the steps of selectively adjusting the supporting arms and the set of coaxial elements whereby the shell and the end members will be properly positioned for operation upon the particular tank of the set of tanks capable of being operated upon by the mechanism.

3. A method as in claim 1 and further including the step of urging the shell into a cylindrical configuration prior to insertion of the end members.

* * * * *